Aug. 18, 1964   H. B. BRAINERD   3,145,291
IDENTIFICATION SYSTEM
Filed July 2, 1959   8 Sheets-Sheet 1

Fig. 1

Henry B. Brainerd
Inventor
by Potter, Chittick + Russell
Attorneys

Fig. 2

Aug. 18, 1964    H. B. BRAINERD    3,145,291
IDENTIFICATION SYSTEM
Filed July 2, 1959    8 Sheets-Sheet 3

Henry B. Brainerd
Inventor
by Potts, Chittick & Russell
Attorneys

Aug. 18, 1964   H. B. BRAINERD   3,145,291
IDENTIFICATION SYSTEM
Filed July 2, 1959   8 Sheets-Sheet 7

Henry B. Brainerd
Inventor
by Porter, Chittick + Russell
Attorneys

United States Patent Office 3,145,291
Patented Aug. 18, 1964

3,145,291
IDENTIFICATION SYSTEM
Henry Bowen Brainerd, 10 Upland Road,
Wellesley 81, Mass.
Filed July 2, 1959, Ser. No. 824,542
12 Claims. (Cl. 235—61.11)

This invention relates generally to an identification system and is more particularly concerned with a fully automatic identification system for moving vehicles such as railroad vehicles.

It is not an exaggeration to state that in considerable measure the prosperity of our nation depends upon the health and prosperity of the railroads, the backbone of our transportation system. No more effective scheme has been devised to transport large numbers of people and goods from one point to another safely, economically and comfortably. While the role of the railroads has changed with the improved technology of the automobile and aircraft industries there is no doubt that the railroad system is a vitally necessary part of our transportation network.

Yet history has frustrated the capabilities of American railroads in finding their proper role in respect to the other forms of transportation. The regulatory practices of the Interstate Commerce Commission and the Public Utility Commissions of various states, the railroad brotherhoods and in part the railroad managements themselves have contributed to the problem. Handicapped partly by tradition, by union restrictions and by a maze of regulations to which no other private sector of the economy is subject, the railroads for many decades have sought to deal efficiently with the day-to-day handling of freight and passengers within the statutory rate framework permitted them. As a result, for these many decades there has been continuing analysis of the economics of railroad operations. This in turn has brought forth a multitude of proposed solutions and inventions designed to decrease cost and increase efficiency and safety in the handling of railroad vehicles. Yet in many phases of railroading the number of man hours required to deal with matters substantially routine and repetitive have not been satisfactorily reduced.

New schemes are constantly being introduced to facilitate the assignments presented to the railroads in each day's operations. But these improvements, heretofore, have been generally no more than the streamlining and refining of the efforts of men and use of manpower.

The problem of identifying and assorting freight cars is one of the major tasks of practically every railroad. It is a function performed in a classification yard and is comparable to the function of a sorter in a post office who places letters into various mail sacks according to their destination. A classification yard is the center at which arriving freight rtains are broken up and the cars sorted according to destination to form new trains.

Cars are loaded at private sidings or public freight depots. A document called a waybill is made out for each car giving the car number, route, destination, consignee, shipper, contents, special instructions, and any other pertinent information. This waybill accompanies the car from origin to destination of the shipment in the charge of the conductor of the train in which it is hauled.

Loaded cars in metropolitan areas are taken by a switcher to assembly yards. At outlying points cars are picked up by a way freight. Cars go most of the distance in through trains, and are eventually set out at destination by a way freight or switcher. Usually, except for a few short hauls, a car goes through one or more classification yards.

In most cases, the cars are brought to a freight yard in the order in which they were picked up and are not sorted for their destination. Up to the early 1900's all classification was done in "flat" years, where a switch engine shuttled back and forth hauling cars out of one track and shoving them onto another. The yard conductor referred to his handful of waybills, while his crew threw switches, coupled and uncoupled cars, released and set brakes in response to his hand signals. This is still done to some extent.

About the beginning of World War I, "hump" yards were introduced. While a locomotive pushed cars slowly over the hump a rider got on each car to handle the brakes, a man uncoupled each car and the yard conductor signaled track numbers to a crew of switchmen who threw the switches by hand.

Somewhere about this time it became common practice to walk down a train and write down car numbers in order, then fill in track numbers from the waybill information to form a "switch list." This was much more convenient for switching and protected the waybills from rough handling.

In the 1920's the car retarder was introduced. This is a power operated device along the track which presses on car wheels by manual control and slows the car down, eliminating the need for riders. Along with this mechanization the yard switches were made power operated. This allowed three or four men to handle the retarders and switches for an entire yard. Each man received a duplicate copy of the switch list, either by pneumatic tube or by Teletype.

In the 1940's the control of the retarders was automated with an electronic analog computer, which could take into account the weight and "rollability" of each car, the curve resistance to the selected track, the number of cars in the selected track and wind velocity, so that each car would leave the last retarder at a speed that would let it couple onto the car ahead without damage. Switch controls were arranged for pre-programming, and in some cases the teletyped track number can control the switches without any action by the operator. With this system one man can supervise the retarders and switches of the largest yard.

During this same period there was a trend toward fewer and bigger classification yards made possible in part by the increased use of semi-automatic techniques. Today, cars out of New York and Boston, for example, may be classified at Selkirk for as many as forty destinations. Several destinations will form "blocks" in a train; each block can be set out in a simple switching operation instead of reclassifying the entire train. This saves both car time and operating costs. A car from Chicago to Boston which might have stopped eight or ten times for classification, with a delay of a day or more at each yard during the era of flat switching, can now travel the same distance with only two or three stops, each stop requiring only half a day or less.

At the present time, the clerical work of recording the car numbers, checking against waybills, and preparing switch lists has emerged as a major item of labor costs and delay in the classification, switching and routing of cars. Costs and delays have been somewhat reduced by using closed circuit television techniques. A TV camera at the entrance of a receiving yard scans incoming trains and a clerk in the yard office reads the car numbers from the TV monitor screen into a tape recorder.

When a train pulls into a receiving yard the conductor sends the accompanying waybills to a clerk who arranges them in order with the car numbers as tape recorded and prepares the switch list from this information. This list may be typewritten then carried by pneumatic tube, transmitted by Teletype, punched in tape for later Teletype transmission, or punched in IBM type cards.

Modern communications techniques such as two-way radios, paging loudspeakers, and two-way loudspeakers, direct switch engines moving blocks of cars to the departure yard, men connecting air brake hoses, and other necessary operations.

While much of the hard and dangerous physical labor of the classification process has been reduced there is still need for personnel to observe, record, verify, and supervise the various sorting operations. What has been required, therefore, is a means of automatically identifying individual railway cars, storing the information, sorting the information, and then matching the identities of the cars to their destinations in order to assemble cars in groups by destination.

It is an object of my invention accordingly to provide completely automatic means for the identification of railroad cars.

Another object of the invention is to provide fully automatic recording and storage means for the identity data. A further object of the invention is to provide a completely automatic identification system which can economically be used by all railroads and freight cars in the country. An additional object of the invention is to provide an automatic system of identification having an inherent high order of reliability.

A further object of the invention is to provide identification means which may be visually inspected and which moreover correspond character by character to the identifying lettering of the car.

Still another object of the invention is to provide an identification system which can be used at interchanges with other railroads to automate car accounting with considerable reduction in clerical labor and errors, and with fewer delays of cars. A still further object of the invention is to provide a system of identification which can be successfully integrated with current communication facilities such as railroad Teletype equipment and associated devices. A still further object of the invention is to provide an identification system which can be used with currently available digital computer equipment with little or no modification. Still another object of the invention is to provide automatic identification to give an up to the minute report on the location of any carload shipment at negligible cost. Another object of the invention is to provide a system which can be used with a hot box detector to identify a bad-order car. A further object of the invention is to provide an identification means for each car which is passive, requiring no further energy sources, and which requires minimal upkeep and infrequent replacement. An addition object of the invention is to provide an identification scheme which in large measure employs components and techniques which have been thoroughly tested and have known operational reliability, operating tolerances, and limitations. Still another object of the invention is to provide an identification system having a primary unit capable of withstanding the rigors of continuous exposure to the weather and to the environment and circumstances in which railroad operations generally occur. An additional object of the invention is to provide identification means which operate entirely independently of the structural material of the car. Another object of the invention is to provide identification means which do not project beyond the existing structure of the car. A further object of the invention is to provide an identification system which is designed to work satisfactorily over any range of car widths and floor heights now in use or known to be proposed. A still further object of the invention is to provide a system which meets the highest standards of safety. Another object of the invention is to provide an identification system which avoids the use of radio signals and thus will not interfere with other forms of communication.

In the accomplishment of these and other objects of my invention the railway cars or other vehicles to be identified are provided with radiant energy reflective markings. A radiant energy source directs light in this embodiment upon the markings. In the description which follows the directed energy has been sometimes termed interrogating energy. A sensing device is positioned in operative relation with the vehicles so that reflections from the markings, which will be coded for each vehicle, can be sensed thereby.

A feature of the invention is the use of light energy retro-reflective materials for the coded reflective markings. Retro-reflective material is material which reflects light back close to the same axis as the initiating or incident energy. Retro-reflective light energy is not only positionally or geometrically more easily sensed than specularly reflected light but its concentration also permits better discrimination of the information carrying reflections from ambients in the environment.

Thus the wayside device has one unit which directs a beam of radiant energy on the reflective markings and a second unit, a sensing device, which picks up the coded reflected energy therefrom.

Another feature of this invention is that the coded markings can comprise a series of blocks of grouped vertical strips of retro-reflective material with spaces between. The strips are three different colors, for example, red and green positioned on a white background so that a white strip separates the colored strips. The total number of strips is fixed and an identifying binary code is formed by various patterned combinations of the two colors on white. For example, a red strip could represent "zero" and a green strip could represent "one" in a binary code system. Each patterned block of six colored strips with white strips between represents a single alpha-numeric character. Then blocks total, representing ten characters, would be adequate to identify every railroad car in North America allowing four digits for the owner's designation and six digits for the owner's number for the particular car. A further feature of this scheme is the basic simplicity and economy of using reflective sheeting for an energy interrogatable coded system for each railway car. The fact that the markings are passive is another feature of the system.

There is already available retro-reflective material having minute glass beads imbedded in a suitable binder on adhesive sheeting. The code can be preprinted of red and green strips on white sheeting leaving white areas between the strips or separate colored strips may be pasted in suitable patterns. If each block of sheeting represents one character or digit, the white between, responding on both red and green outputs of the radiating sensing system would advance a counter or sequencer for code elements of one character, while the non-reflecting or black surface of the car between characters would count the characters. Making each digit block a separate piece allows assembling any required vehicle marking from standard pieces, and permits placing the pieces in whatever spaces are left by rivet heads, ribs or other protuberances.

The wayside device includes a radiant energy source having an optical system to limit the horizontal width of the radiated energy. Sensing means responsive to the coded reflective energy consists basically of photocells placed close to the same axis as the source of light energy but properly screened therefrom.

The sensing device is coupled to a recording device which can be located remotely. It will include as many recording elements as there are strips sensed on a car, plus a sequence connecting device. The non-reflective spaces between the strips cause a greatly decreased output from the light responsive circuitry which is arranged in turn to cause the sequence connecting device to advance to the next series of recording elements.

A further feature of the invention is the use of conventional data compilation and storage techniques for the received coded pulses reflected from any particular car. These techniques are versatile, mature, well-advanced and well-known. The sequence connecting device could be rotary stepping switches or counting chain of relays, or vacuum tubes or transistors. The recording elements could be relays, vacuum tube flip-flops, transistor flip-flops, magnetic cores, or any other convenient digital device. These are arranged to transfer the record of each car to some punched or magnetic medium with enough capacity to record one or more trains. This medium may be remote from the sensing device.

The use of an optical system is another feature of the invention and is preferable to any other system such as magnetic, or electro-magnetic interrogation techniques because of the wide variety of materials used in cars, for example, steel, stainless steel, aluminum, and wood. Moreover, using radio energy can cause interference problems.

Still another feature of the invention is that the use of a light source and retro-reflective coded markings and a reflected light sensing device allows a large tolerance both in vertical, lateral, and longitudinal location of the markings to fit the construction of the different cars and in the location of the sensing device relative to the track. An additional feature of the invention is that the method of sensing is independent of the speed of the cars past the sensing device. A further feature of the invention is that the use of a fixed number of elements in the identification code strip, each of which must be sensed as either one of two colors, provides inherent self-checking. An additional feature of the invention is that self-checking can be provided if necessary. Yet another of the features of the invention is that the retro-reflective material will provide an additional safety feature, particularly at highway crossings at night. Another feature of the invention is the provision of a standard numeral or letter on the binary character and digit blocks to permit visual as well as automatic identification. This also insures correct placement on the vehicle side.

Application of the retro-reflective material to cars is an extremely simple and inexpensive operation. Thus it is another feature of the invention that the application by means of a stencil or fully prepared adhesive sheets insures that the labor cost per car is of the order of magnitude of one or two dollars at the most. Because each block has a numeral or letter thereon equivalent to its binary form, visual selection is greatly facilitated and installation can be performed by unskilled labor. Moreover, periodic inspection requires nothing more than a man who can read and use a flashlight.

Another feature of the invention is that all the components necessary for the sensing device are currently available. Design criteria are well-known and component reliability under the most unfavorable conditions has been thoroughly demonstrated. Still another feature of the invention is the applicability of the resulting coded information in the form of electrical pulses to current Teletype relay techniques whether the standard Teletype code of five units is employed or the IBM six-unit code.

These and other features of the invention will best be understood with the aid of the accompanying drawings in which.

(I) *Equipment Generally*

Figure 2:
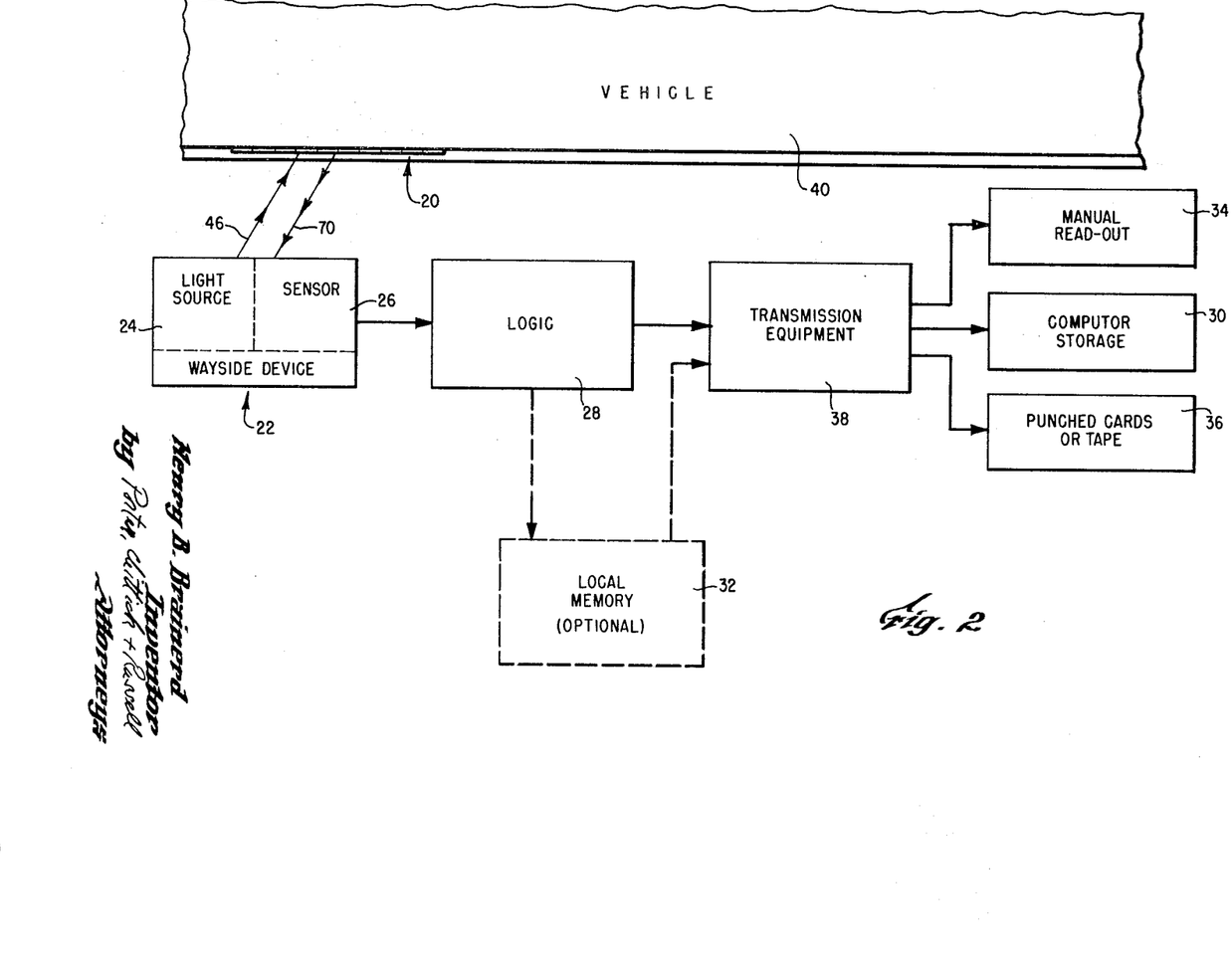
FIG. 2 is a block diagram of the identification system.

The preferred embodiment of my invention herein described is shown in blocks in FIG. 2 and comprises the combination of binary coded retro-reflective markings 20 affixed to each of the vehicles to be identified, and a wayside device 22 mounted near the track side to function in operational relationship with the coded markings 20. The wayside device 22 consists of two separate units, an interrogating unit 24 which shines or directs a vertical, narrow beam of radiant energy (light) upon the markings 20 and a sensing unit 26 which is responsive to the energy reflected from the markings. From the sensing unit 26 electrical signals corresponding to the code pattern of reflected energy are fed to appropriate computer logic 28 the output of which is in turn fed to a computer storage unit 30 or local memory 32, and there to various read-out devices 34 and 36. For remotely located equipment, a transmission facility 38 is made part of the system.

(II) *Operation Generally*

Each railway vehicle 40 has affixed to its side an identification code made up of ten patterned blocks 42 of retro-reflective material. Each such block 42 consists of retro-reflective strips 44 of two colors alternating with a strip of white reflective material between the colors. The wayside device 22 is positioned in respect to the track side so that light energy from the interrogating unit 24 is directed at the reflective blocks 42 which are arranged in an identification code. The sensing unit 26 is positioned to selectively respond to the three values of reflected light energy, two different colors and white, caused by light emitted from interrogating unit 24 being reflected from the strips 44 which make up the blocks 42. The sensing unit 26 distinguishes each of the two colors and white, changing the reflected energy into corresponding electrical pulses. The pattern for each block 42 is made of the two colors with white between and represents in digital or binary notation a particular letter or number character. The computer logic 28 assembles the electrical pulses, each of which corresponds to a binary digit (bit), into a collection of six bits forming a letter or number character and then collect the ten characters which form the coded designation of the particular vehicle. The designation is fed to the storage unit 30 and/or local memory device 32 to be retained at least long enough for any single train of cars 40 to pass. The information stored can either be permanently recorded on IBM cards or tape, transmitted to a remote location, printed in alpha-numeric form or temporarily presented, for example, on a lighted board. Alternatively, the logic-recording system 28 and 30 might be arranged and programmed so that cars of any particular code designation having been interrogated and sensed would initiate a series of directions addressed to some other computer program.

(III) *Coded Markings*

Figure 1:
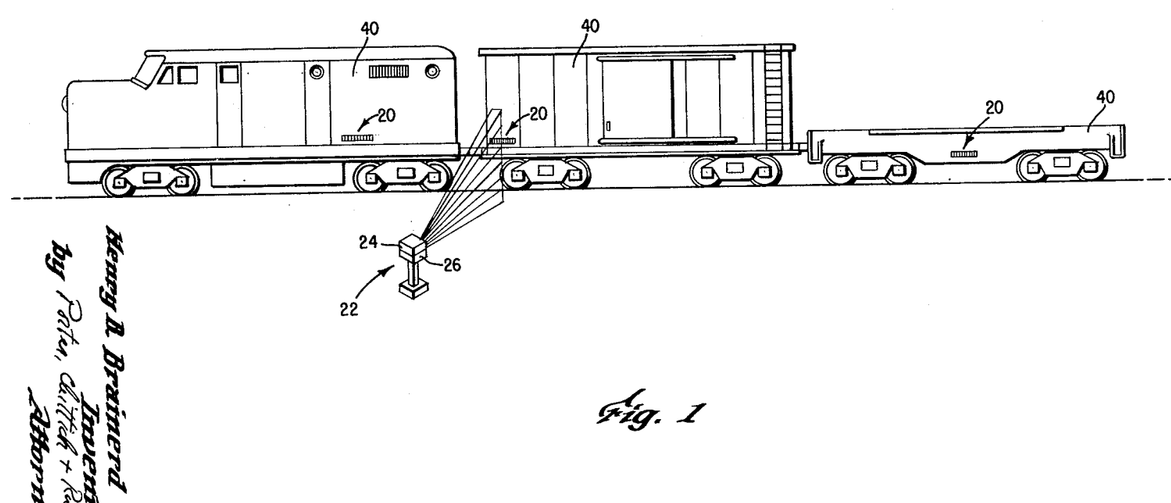
FIG. 1 is a perspective view of railway cars and an engine bearing coded identification strips with a wayside device mounted in operative relation to the strips.

As shown in FIG. 1 each car 40 would have affixed to the sides thereof ten blocks 42 of the coded markings 20.

Figure 3:
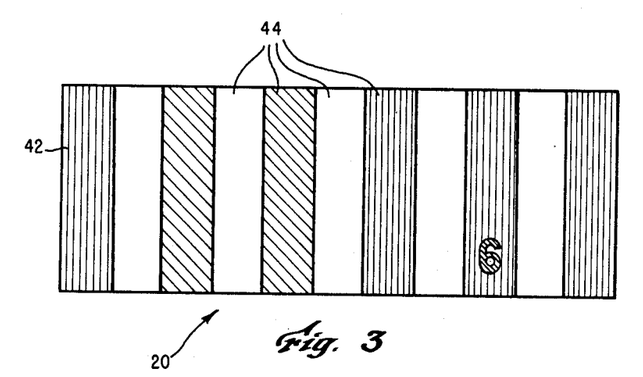
FIG. 3 shows the arrangement of the coded markings affixed to each railway car.

An individual block 42 is shown in FIG. 3. Each block is about 2" x 5", and is composed of six colored strips 44 of retro-reflective material, with what is in effect a white strip between each colored strip forming a pattern which can be arranged in sixty-four permutations. The patterns can be fabricated by printing the particular color pattern thereon or might be fabricated more conveniently by using a sheet of white retro-reflective material on which the color strips 44 are applied.

The code pattern on each block 42 is made digital by having one of the colored strips 44 represent binary "zero," the strip of the other color representing binary "one." Each of the ten blocks 42 can thereby represent in digital form an alphabetical or numerical character. Thus, in the simplest binary notation, a block 42 having, for example, red and green strips with green representing "one" and red "zero," a left to right pattern (ignoring the white strips in between) of red-green-red-red-red-red- would indicate the number two and a pattern of strips red-green-green-red-red-red- would correspond in binary form to the number 6 as shown in FIG. 3. A combination of ten blocks 42 are sufficient to give an identification designation for all the railroad cars in North America using four blocks for the owner's alphabetic code and the remaining six for the numerals.

While the colors green and red have been chosen for purposes of this preferred embodiment it should be pointed out that the particular colors are unimportant so long as they are sufficiently different. The two colors chosen should be selected to be spectrally quite distinct and distinguishable. There is no reason, of course, why the two different strips could not be distinguishable by video sensing means and yet undifferentiatable by the human eye. Also, different strips having different polarizing characteristics could be employed. Yet it would seem to be an advantage to use visually distinct colors and thus permit ready non-automatic observation that the correct blocks are properly arranged. An additional element of convenience is providing each code block 42 with the equivalent actual number or letter printed thereon. A further advantage of visible red and green strips is that the markings would serve as an added safety measure.

For the markings the material "Scotchlite" is available. It is a flexible sheeting with retro-reflective glass beads on the face and pressure-sensitive adhesive on the back, obtainable in white and colors. Transparent inks are available for printing or stenciling. It is more easily applied and is presently more efficient optically than any available retro-reflective paint.

(IV) *Wayside Device*

The wayside device 22 consists of two closely situated but distinct units, the interrogating unit 24, and the sensing unit 26. The interrogating unit 24 is basically a light source which directs at the sides of passing railroad vehicles 40 a horizontally narrow band of radiant light energy 40 having a considerable angular dimension in the vertical plane. As each railroad car 40 moves past the band of light energy 46, the various coded data patterns of green, white and red strips 44 on the blocks 42 affixed to the sides of the cars will reflect light of different color values to which the sensing unit 26 will respond.

The light source 24 concentrates its output on an area a foot high and less than half an inch wide at a distance of 3'0" to 3'6" from the projector. The sensing unit 26 must pick up the retro-reflected light as close as possible to the source projector 24 and separates red and green components onto two light responsive means. The light projected onto the markings 20 must be bright enough that the retro-reflected component reaching the sensing unit 26 is markedly stronger than the brightest diffused reflection of sunlight or any other ambient light. Power limitations at a remote location and signal-to-noise ratio in the sensed information require that optical efficiency be maximized.

(A) *Interrogating Unit*

Figure 4:
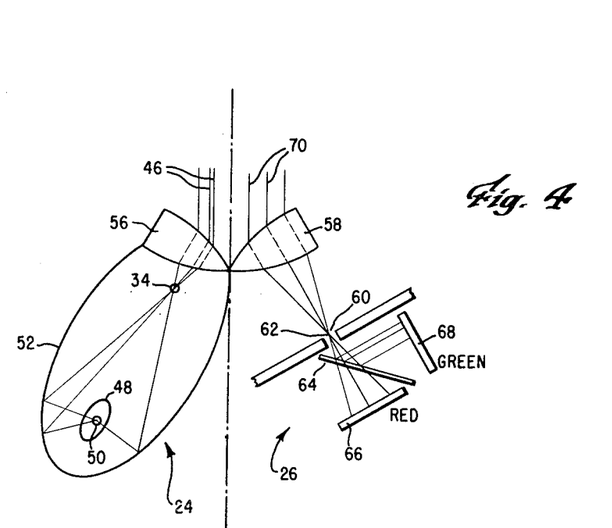
FIG. 4 is a diagrammatic representation of the optical system of the wayside device taken on a horizontal section.

In FIG. 4 there is shown in horizontal section a detail of radiant energy source or interrogating unit 24. A light source 48 which is a point or vertical line of light is located near the rear focus 50 of a substantially elliptical reflector section 52 in such a way as to concentrate light at a focal point 54 some distance from the focus. The reflector 52 could also have a semi-cylindrical shape, or any configuration capable of focusing a vertical line of light. In front of the focal point 54 is a combined transmitting lens and prism 56 for projecting the light in a beam essentially parallel in horizontal cross section; the focus 54 of this lens and prism 56 is also the front focus 54 of the elliptical reflector 52.

(B) *Sensing Unit*

The narrow vertical band of light 46 played on the coded blocks 42 causes light 70 of various spectra to be reflected back to the sensing unit 26. The latter is located roughly on a common vertical axis with the interrogating light source unit 24. Since the reflections are parallel to the initiating stimuli, a receiving lens 58 similar to the transmitting lens 56 focuses the retro-reflected energy. A vertical slit 60 is provided near the focus 62 of the receiving lens 58 to limit accepted light to a region narrower than the image of any given strip 44. Immediately behind the slit 60 and located at a diagonal thereto is a dichroic mirror 64. A dichroic mirror is one which will transmit one color but will reflect another. A light sensing device 66 for the transmitted color is located behind the dichroic mirror and a light sensing device 68 for the reflected color is located at an angle thereto.

Figure 5:
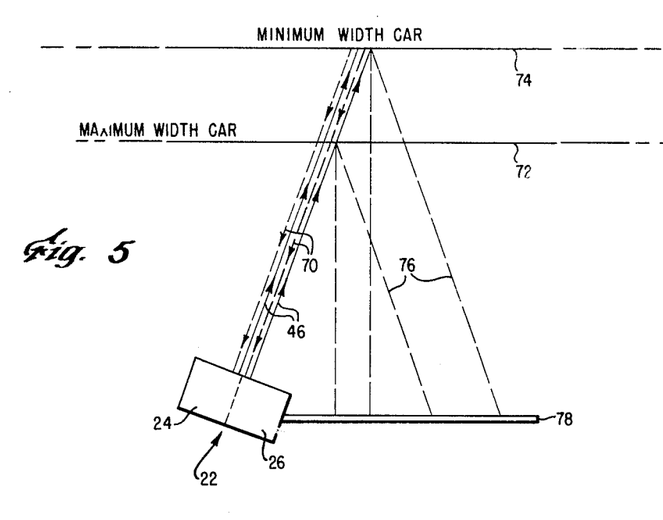
FIG. 5 is a top view in schematic form of the operational relationship between the wayside device and the vehicle markings with the energy radiation and reflective pattern indicated. Maximum and minimum car widths are also shown.
Figure 6:
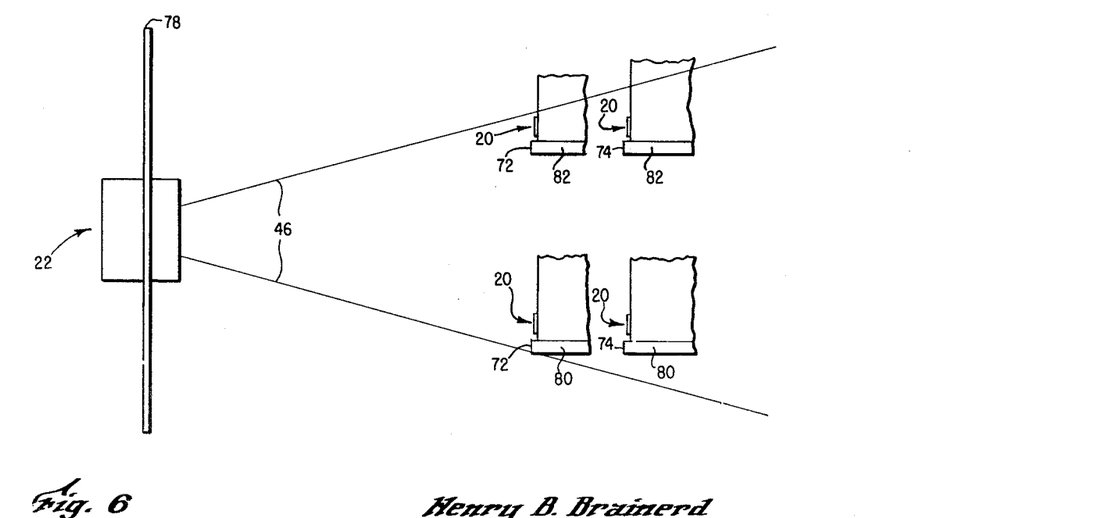
FIG. 6 is a view of the wayside device in operational relationship with the coded vehicle markings viewed along the vehicle axis. Maximum and minimum car widths and maximum and minimum car heights are also indicated.

Indicated diagrammatically in FIGS. 5 and 6 is the operation of the interrogating beam of light 46 upon the coded markings 42 and the effect of various car widths and floor heights. Thus in FIG. 5, the horizontally narrow light beam 46 represented by parallel double lines with arrows is directed at car sides of a maximum width car 72 and minimum width car 74. Retro-reflected energy 70 represented by two parallel solid lines with arrows in the opposite direction is returned to the sensing unit 26 along the same axis as the interrogating beam 46. Light reflected specularly from the markings is represented by the dashed lines 76. A shield 78 is provided to prevent interfering light from being reflected specularly to the sensing device.

A side view of the interrogating light beam 46 in FIG. 6 indicates the manner in which the vertically spreading light energy can accommodate markings on the widest car 72 with a considerable difference between the lowest 80 and highest 82 car floors where the blocks 20 can be affixed. FIG. 6 also shows a narrow car 74 with low 80 and high 82 floors. The vertically wide angular configuration of the light beam 46 thus permits interrogation irrespective of either the floor height or of the width of any vehicle 40.

(C) *Logic*

It should be noted that the logical units shown here are not necessarily the simplest that will accomplish the purpose, nor is the operating sequence necessarily the only one. The units and sequence here described demonstrate, however, the practicability of the whole system. In fact, there are many devices already available commercially which with only a slight amount of modification could perform the sequences outlined below or at least give the same described result.

As the cars 40 move past the light beam 46, the various strips 44 on any car will reflect light of different color or spectral values, green, red and white. The light sensitive devices 66 and 68 either separately or simultaneously (in the case of white reflected light) convert the reflected energy into electrical pulses. The absence of reflected light also has operative significance and thus can be considered as a fourth electrical input pulse.

Figure 7:
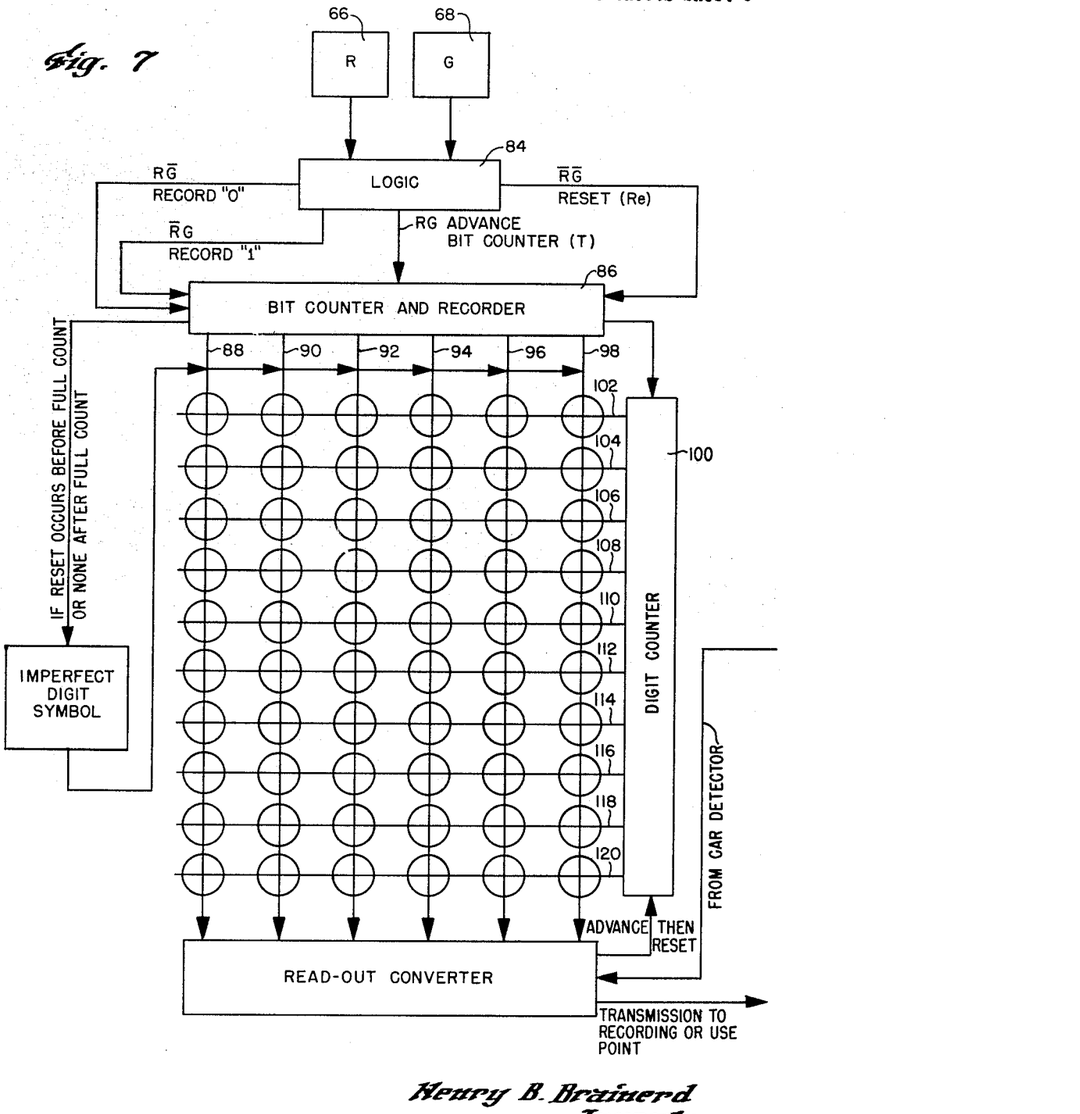
FIG. 7 is a general schematic arrangement of the signal inputs to the storage system showing logic, bit counter-recorder, digit counters, read-out converters, and matrix of memory elements.

The general operation of the sensing logic can be explained with particular reference to the block diagram shown in FIG. 7. The two sensing inputs R and G stand for red and green and are equivalent respectively to 0 and 1 corresponding to the different energy values reflected from the identification code. The logic elements in block 84 determine whether one signal is present or both or neither. The four possible inputs consist of red present—green absent (RḠ), red absent—green present (R̄G), red and green both present (RG), or neither (R̄Ḡ) all of which are fed into a bit counter-recorder 86. When (R̄G) occurs "one" is recorded, when (RḠ) occurs "zero" is recorded. When both red and green are present (RG) the bit counter 86 is advanced and when neither red or green is present (R̄Ḡ) the counter is reset.

The six leads, 88, 90, 92, 94, 96, and 98, from the bit counter-recorder 86 represent as many successive output paths as there are bits in a digit or character, in this case six bits. After the first bit is recorded through the first output, an "advance bit counter" signal caused by reflection from a white strip will transfer it to the second output, then to the third, fourth, fifth and sixth, as each bit is recorded. But before the first bit is recorded, the "advance bit counter" signal will have no effect. A reset signal before the last bit is recorded will cause the "imperfect digit" code to be substituted for whatever has been recorded.

A digit counter 100 will have as many outputs 102–120 as there are digits. The schematic intersection of an output from the digit counter 100 and one from the bit counter 86 is the location at which the "1" or "0" of one bit is recorded. This recording location could be a magnetic core, flip-flop or any other one bit device. In summary, the schematic operation is to record each digit of six bits in a horizontal row a bit at a time, then advance vertically to the next row for the next digit.

The "from car detector" input is either from some separate device such as a strain gauge on the track or it could be a special extra digit code such as all zeros, that is a code pattern block 42 of red-red-red-red-red-red, that would come from the bit counter 86. This input will cause the record of one vehicle is read out into whatever recording medium or transmission line is to utilize the information. For this purpose, the digit counter 100 will rest, read-out a digit, advance, read-out the next digit and finally reset after the last digit and stand ready for the next vehicle.

Figure 8:
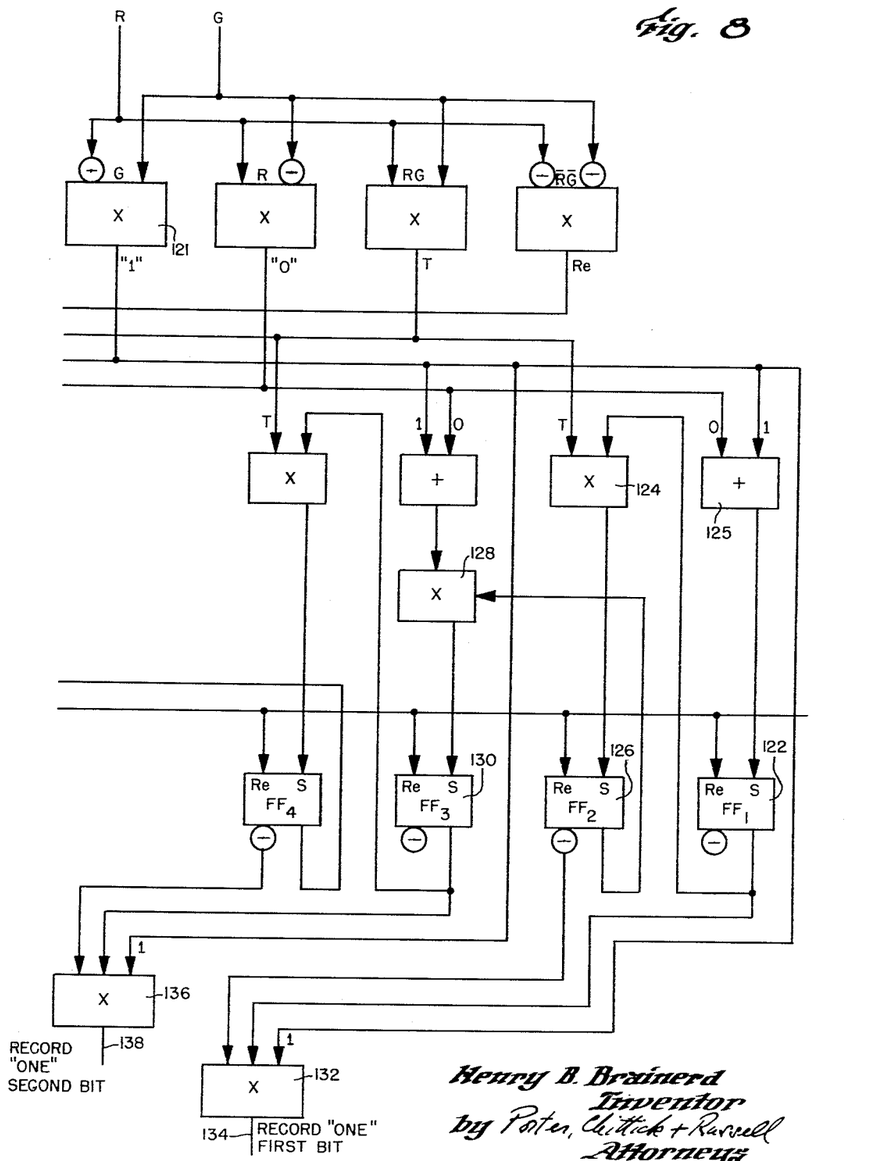
FIG. 8 is a block schematic arrangement of the initial portion of a bit counter and associated logic.

Referring to FIG. 8, marking information is sensed as follows: Color R alone RḠ represents informational "0"; the "and gate" receiving RḠ puts out an electrical "one" to indicate this on the line labeled "0." Color G alone R̄G represents informational "1"; the "and gate" receiving R̄G puts out an electrical "one" on the line labeled "1." Both together RG, i.e. white, serve to switch between bits; the "and gate" receiving RG puts out an electrical "one" on the line labeled "T" for transfer. Absence of both R̄Ḡ (no reflection) serves to switch between digits of characters; the gate receiving R̄Ḡ puts out an electrical "one" on the line labeled "Re" for reset.

Initially all bit counter flip-flops 122, 126, 130 and so forth are reset (Re) and all memory elements are zero or reset. In this condition a white or "T" signal will have no effect. Either a "1" or a "0" signal will set the first flip-flop through the "or gate." If it is "1," the first flip-flop set and the second reset will allow it to pass the "and gate" 132 below to the "record one first bit" line 134.

The first flip-flop 122 set opens an "and gate" 124 over second flip-flop 126 to allow a T signal to set it. This in turn opens an "and gate" 128 over a further flip-flop 130 and allows either a "1" or "0" signal to set it and also closes an "and gate" 132 to the "record one first bit" line 134. If the second bit is a 1 it passes an "and gate" 136 to "record one second bit" 138. Successive bits operate the successive flip-flops in the same way until the last flip-flop 140 is reached or a Re signal is received (FIG. 10).

A Re signal with the last flip-flop 140 still reset through gates 141 and 145 or a T signal with the last flip-flop set through gates 143 and 145 operates the "imperfect digit recorder" 142 to substitute the symbol for an imperfect digit for whatever has recorded since the last reset.

Figure 9:
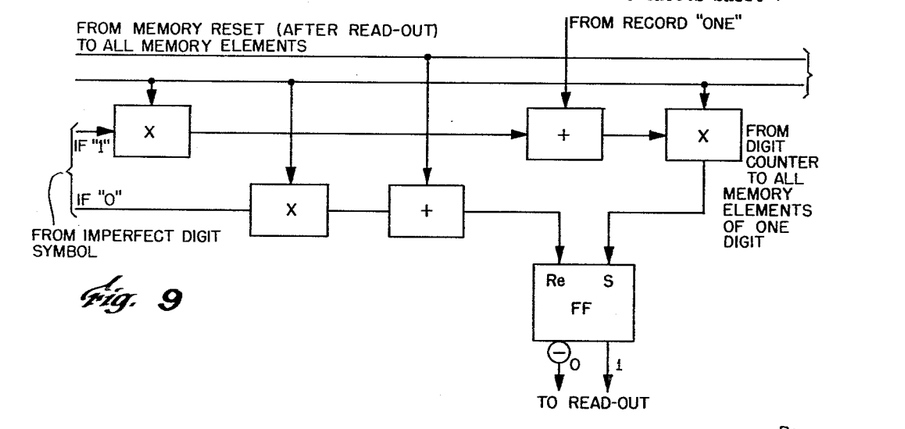
FIG. 9 is a block schematic of a typical element in a memory device.
Figure 10:
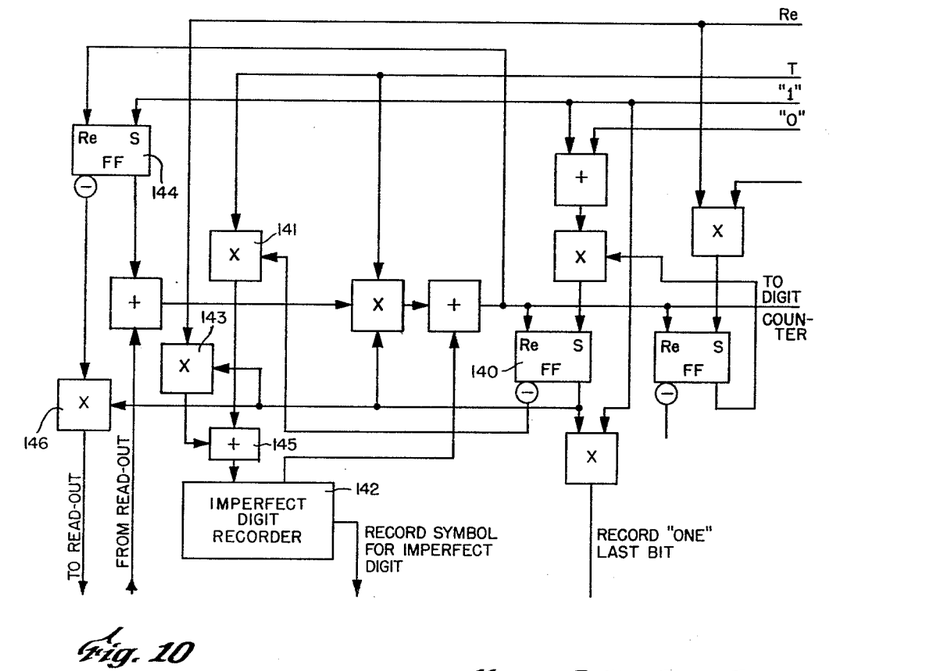
FIG. 10 shows a block schematic of the final portion of a bit recorder.

A "1" signal at any time during a digit sets an auxiliary flip-flop 144 indicated in FIG. 10. When this remains reset as the last regular flip-flop 140 is set it indicates an all zero code that marks the end of one vehicle identification and opens a gate 146 to the "to read-out" line. If the auxiliary flip-flop 144 and the last regular flip-flop 140 are set, an Re signal resets all flip-flops. But if the read-out operates, its return signal resets all flip-flops. The imperfect digit recorder 142 also resets all flip-flops. Resetting all flip-flops also advances the digit counter 100 to advance to the next digit in the memory. A typical memory element is shown in FIG. 9.

Another approach to the same logical performance is by use of "shift registers." A shift register is an assemblage of memory elements so arranged that when a "shift" signal is applied the entire information content is shifted one step and the element that records the input is made available for the next input information. In other words the input information is recorded at a single point and then transferred rather than the input connection being transferred and the information remaining at a fixed location.

For this application a full use of the shift principle would involve a "two-dimensional" shift; i.e. successive bits would shift down a line to form a digit, then entire digits would shift in a second direction down an assemblage to form a multi-digit identification code.

Other variations of the invention will be apparent to those skilled in this art. For example, in some applications or circumstances it might be more effective to pulse the light source at a frequency of a few thousand cycles and employ an appropriate pulse discrimination function in the sensing operation. Regular light pulses are considerably more distinguishable from random ambients than a steady directed beam in troublesome milieu.

Figure 11:
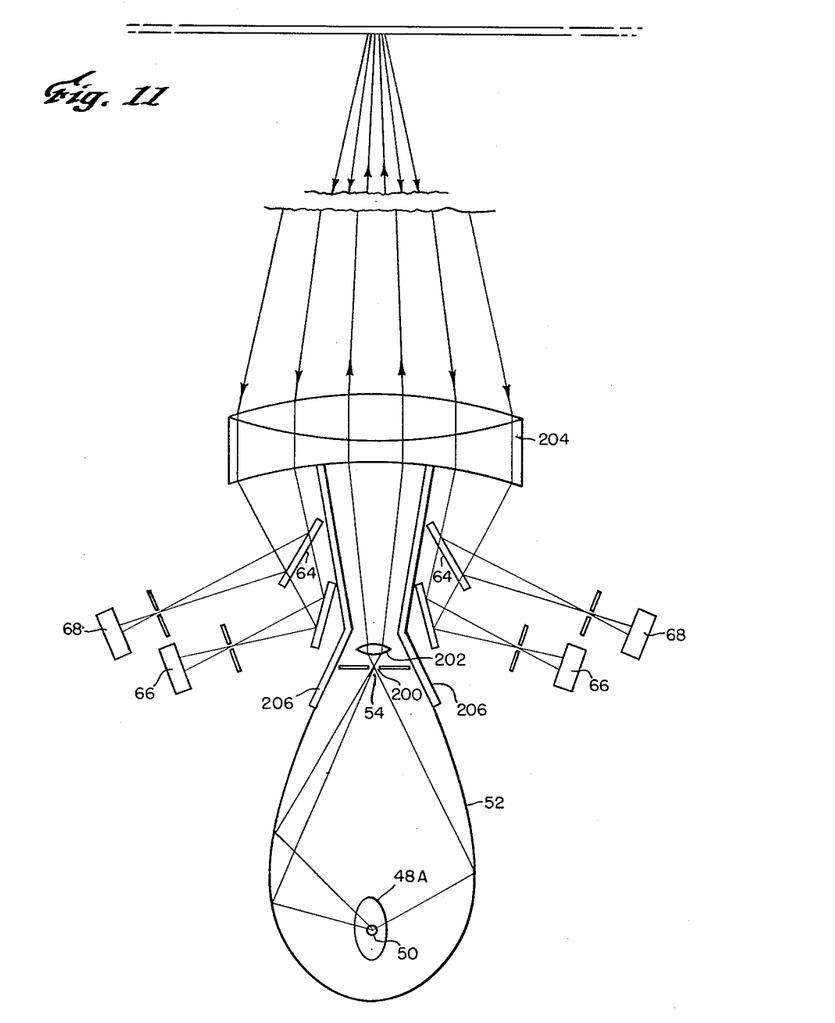
FIG. 11 is a diagrammatic representation of an alternative light source.

FIG. 11 shows an alternative form of the optical system shown in FIG. 4. Light source 48A with a vertical line filament at the rear focus 50 of elliptic mirror 52 causes a vertical line of light to concentrate at the front focus 54, at which limiting slit 200 is located. Field lens 202 concentrates the light emerging from slit 200 in a narrow beam. This beam passes through projection objective lens 204 which focuses the light into a concentrated narrow line on the markings 20 of the vehicle 40 to be identified. Lens 204 must have good definition and color correction to form the desired narrow line.

The retro-reflected light from the markings 20 falls on the entire surface of the lens 204. Light on either side of the narrow source beam falls on dichroic mirror 64, from which one color is transmitted to light sensitive elements 66 and the other color is reflected to light sensitive elements 68. Shields 206 prevent stray light from the source from reaching the light sensitive elements 66 and 68.

High frequency modulation of the light may be produced by vibrating the sides of slit 200 electromagnetically.

Since still other variations of the preferred embodiment of the invention will occur to those skilled in the art, it is not intended to confine the invention to the precise form herein shown, but to limit it in terms of the appended claims.

I claim:

1. An identification system adapted to give positive identification of individual objects moving sequentially along a predetermined path, said system comprising an interrogating unit located at a fixed position along side said path, said interrogating unit including a light source and an optical system, said light source emitting a broad spectrum of light including at least two distinct and distinguishable bands of light, said optical system directing such light in a narrow oriented beam intercepting the path of travel of said objects; light reflecting markings positioned on said moving objects in position to intercept said beam of light, each said marking formed of a plurality of elongated strips of retro-reflective material adapted to reflect light substantially along the same axis as the axis of light incident thereon, said strips oriented parallel to the orientation of said light beam and arranged as to be successively illuminated by said beam, the material in said strips being selected from retro-reflective material having reflection-absorption characteristics of a plurality of types, said types reflecting variously each of said bands while absorbing the other of said bands and reflecting a plurality of said bands simultaneously, said strips arranged by type in a predetermined code pattern, which code pattern may include operationally non-reflector strips as well as strips having said differing reflection characteristics; a sensing unit located at a fixed position alongside said path in close association with said interrogating unit and adapted to receive the retro-reflective light beam emitted from said interrogating unit and reflected from said light reflecting markings, said sensing unit including a light mask, a light splitting means and a plurality of photo-electric light sensing means, said light mask having an elongated light passing slit oriented parallel to the orientation of said light beam, and of said coded strips, said slit having a width such that only light of a beam width narrower tha nthe image of any given strip in said light reflecting marking is passed therethrough, said light splitting means comprising at least one dichroic mirror positioned in the path of said reflected beam and adapted to reflect light of one said band and to transmit light of any other said band to one of said photo-electric light sensing means positioned in each path of light emitted from asid light splitting means, each said photo-electric light sensing means adapted to convert an incident light input to an electrical output; and data processing means operative in response to the electrical output of said photoelectric light sensing means to convert and transmit such output in intelligent form.

2. An identification system as claimed in claim 1 wherein said sensing unit is shielded from light directly emitted from said interrogating unit.

3. An identification system as claimed in claim 1 wherein said beam is directed at an angle to the path of travel of said moving object, said angle deviating from the normal.

4. An identification system as claimed in claim 1 wherein a shield blocking spectral light is provided behind said sensing unit.

5. An identification system as claimed in claim 1 wherein independent means are provided to detect the presence of and object in beam intercepting position.

6. An identification system as claimed in claim 1 wherein means are provided to cause said light to be emitted in pulses.

7. An identification system as claimed in claim 6 wherein means are provided rendering said sensing unit non-responsive except to said pulsed light when reflected.

8. An identification system adapted to give positive identification of individual railway cars as said cars move along a track, said system comprising an interrogating unit located at a fixed position alongside said track, said interrogating unit including a light source and an optical system, said light source emitting a broad spectrum of light including at least two distinct and distinguishable bands of light, said optical system directing such light in a narrow oriented beam intercepting the path of travel of said cars; a light reflecting marking position on the side of each of said cars in position to intercept said beam of light, each said marking formed of a plurality of elongated strips of retroreflective material adapted to reflect light substantially along the same axis as the axis of light incident thereon, said strips oriented parallel to the orientation of said light beam and arranged as to be successively illuminated by said beam, the material in said strips being selected from retroreflective material having reflection absorption characteristics of a plurality of types, said types reflecting variously each of said bands while absorbing the other of said bands and reflecting a plurality of said bands simultaneously, said strips arranged by type in a predetermined code pattern, which code pattern may include operationally nonreflective strips as well as strips having the said differing reflection characteristics; a sensing unit located at a fixed position alongside said track in close association with said interrogating unit and adapted to receive the retro-reflective light beam emitted from said interrogating unit and reflected from said light reflecting marking, said sensing unit including a light mask, a light splitting means and a plurality of photo-electric light sensing means, said light mask having an elongated light passing slit oriented parallel to the orientation of said light beam and of said coded strips, said slit having a width such that only light of a beam width narrower than the image of any given strip in said light reflecting marking is passed therethrough, said light splitting means comprising at least one dichoric mirror positioned in the path of said reflected beam and adapted to reflect light of one said band and to transmit light of any other said band, one of said photo-electric light sensing means positioned in each path of light emitted from said light splitting means, each said photo-light sensing means adapted to convert an incident light input to an electrical output; and data processing means operative in response to the electrical output of said photoelectric light sensing means to convert and transmit such output in intelligent form.

9. An identification system adapted to give positive identification of individual railway cars as said cars move along a track, said system comprising an interrogating unit located at a fixed position alongside said track, said interrogating unit including a light source and an optical system, said light source emitting a broad spectrum of light including at least two distinct and distinguishable colors, said optical system directing said light in a narrow oriented beam intercepting the path of travel of said cars; a light reflecting marking position on the side of each of said cars in position to intercept said beam of light, each said marking formed of a plurality of elongated strips of retro-reflective material adapted to reflect light substantially along the same axis as the axis of light incident thereon, said strips oriented parallel to the orientation of said light beam and arranged as to be successively illuminated by said beam, the material in said strips being selected from retro-reflective material having varying reflecting characteristics as to reflect both said color simultaneously and to reflect each of said colors separately, said strips arranged by type in a predetermined code pattern, which code pattern may include operationally nonreflective strips as well as strips having the said differing reflection characteristics; a sensing unit located at a fixed position alongside said track in close association with said interrogating unit and adapted to receive the retro-reflected light beam emitted from said interrogating unit and reflected from said light reflecting markings, said sensing unit including a light mask, a light splitting means and a pair of photo-electric light sensing means, said light mask having an elongated light passing slit oriented parallel to the orientation of said light beam and of said coded strips, said slit having a width such that only light of a beam width narrower than the image of any given strip in said light reflecting marking is passed therethrough, said light splitting means comprising a dichoric mirror positioned in the path of said reflected beam and adapted to reflect one said color and to transmit the other said color, one of said photoelectric light sensing means positioned to intercept each said color as it emerges from said light splitting means, each said photo-electric light sensing means adapted to convert an incident light input to an electrical output and data processing means operative in response to the electrical output of said photoelectric light sensing means to convert and transmit said output in intelligent form.

10. An automatic car identification system comprising a track side car scanning unit and a coded identification marker placed on the side of each car, said coded identification marker comprising a predetermined array of parallel strips of retro-reflective material arranged according to a pre-established code, said strips selected from strips selectively and individually reflecting light of at least two separate and distinct colors, as well as light of at least two said colors simultaneously when illuminated by a light source including both said colors, said code being based on the sequential arrangement of strips having said varying reflective characteristics; said track side car scanning unit comprising means for illuminating successively the strips in said marker with light including all said colors, means in close association with said illuminating means for receiving the light retro-reflected from said marker, said light receiving means including photo-electric means for separately detecting each of said colors in said code; means for limiting the effective retro-reflected beam received by said light receiving means to a width less than the image of an individual strip; and means for converting the electrical output of said photo-electric means into an intelligent form.

11. An automatic car identification system as claimed in claim 10 wherein the said strips are selected from strips reflecting two colors individually and from strips reflecting both colors simultaneously; wherein said light receiving means includes means for splitting the reflected light into a separate beam for each said color and a photo-electric means for detecting each said split beam individually and converting light incident thereon into an electrical signal; and wherein said code is based on the sequential actuation of said photo-electric means by light retro-reflected from said marker according to a predetermined pattern involving comparison of electrical output from each said photo-electric means according to whether either, neither or both are actuated.

12. An automatic car identification system as claimed in claim 11 wherein separate means are provided for detecting the presence of a car in light intercepting position.

References Cited in the file of this patent

UNITED STATES PATENTS

| | | |
|---|---|---|
| 2,268,498 | Bryce | Dec. 30, 1941 |
| 2,581,552 | O'Hagan | Jan. 8, 1952 |
| 2,628,572 | Legoff | Feb. 17, 1953 |
| 2,689,338 | Singleton | Sept. 14, 1954 |
| 2,761,122 | Singleton | Aug. 28, 1956 |
| 2,916,624 | Angel | Dec. 8, 1959 |
| 2,922,893 | Ett | Jan. 26, 1960 |
| 2,981,830 | Davis | Apr. 25, 1961 |

FOREIGN PATENTS

| | | |
|---|---|---|
| 800,190 | Great Britain | Aug. 20, 1958 |
| 857,797 | France | Sept. 28, 1940 |